J. H. BOOZ.
Thrashing-Machines.

No. 149,981. Patented April 21, 1874.

UNITED STATES PATENT OFFICE.

JONATHAN H. BOOZ, OF BRISTOL TOWNSHIP, BUCKS COUNTY, PA.

IMPROVEMENT IN THRASHING-MACHINES.

Specification forming part of Letters Patent No. 149,981, dated April 21, 1874; application filed March 31, 1874.

*To all whom it may concern:*

Figure 1:
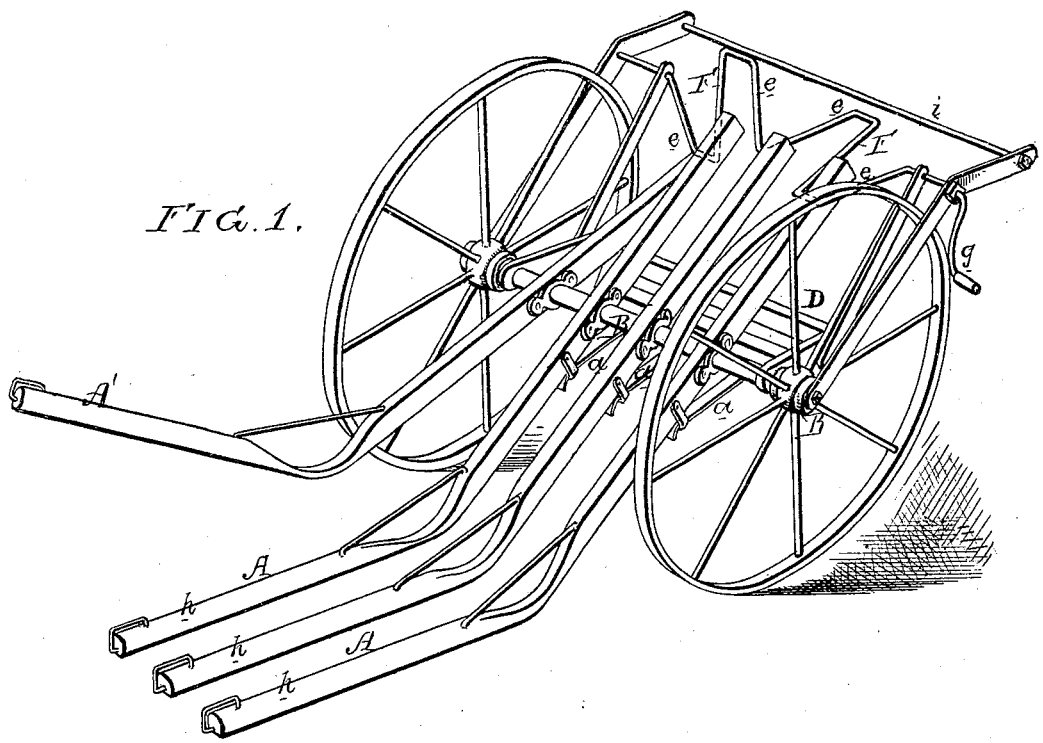
Figure 2:
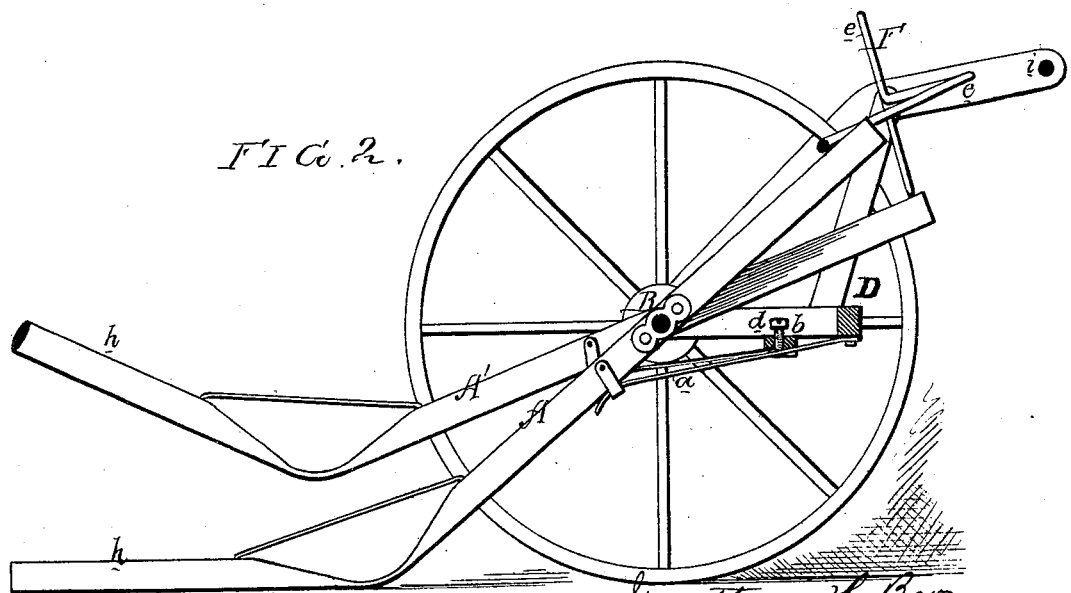

Be it known that I, JONATHAN H. BOOZ, of Bristol township, Bucks county, Pennsylvania, have invented an Improved Thrashing-Machine, of which the following is a specification:

The object of my invention is to thrash rye and other grain without tangling or injuring the straw, and I attain this object by a series of spring-flails, A, hung to the axle B of a truck, D, and operated by a crank-shaft, F, as fully described hereafter, and as represented by the perspective view, Figure 1, and sectional elevation, Fig. 2, of the accompanying drawing.

The flails A, of which four are shown in the present instance, consist of levers, each having its fulcrum upon the axle B of the truck, and each acted on by a spring, $a$, (best observed in Fig. 2,) which tends to depress the long arm of the lever. The springs $a$ extend beneath a cross-bar, $b$, of the truck, provided with set-screws $d$, by which the strength of the said springs may be increased or diminished at pleasure. The operating-shaft F has its bearings in the opposite sides of the truck, and is furnished at a point directly over or opposite the short arm of each flail with a crank, $e$, by which, when the said shaft is turned by means of its handle or handles $g$, the short arms of the flails may be successively depressed and their long bent arms $b$ elevated, as shown at A', and then suddenly released, the flails, owing to the action of their springs, thus striking a succession of sharp blows upon the grain beneath them.

In using the machine, the operator grasps the cross-bar $i$ of the truck with one hand, and thus guides and moves the latter about, so as to bring the flails over the portion of the grain which he wishes to subject to their action, while with the other hand he turns the crank-shaft F, and thus operates the said flails, as above described.

In this way the grain may be beaten from the ears without that tangling and otherwise injuring of the straw which occurs in ordinary thrashing-machines. The operation can be performed much more rapidly and effectually than by a hand flail, which is still used for thrashing rye and other grain when it is desired to preserve the straw.

I propose, in some instances, to furnish the shaft F with simple arms, instead of cranks, for operating the flails.

I claim as my invention—

The within-described thrashing-machine, consisting of a series of spring-flails, A, hung to a truck, D, and arranged to be operated from a shaft, F, all substantially as specified.

In testimony whereof I have signed my name to this specification in the presence of two subscribing witnesses.

JONATHAN H. BOOZ.

Witnesses:
 WM. A. STEEL,
 HUBERT HOWSON.